United States Patent

Hummer, Jr.

[11] Patent Number: 5,155,918
[45] Date of Patent: Oct. 20, 1992

[54] GUIDE BAR

[76] Inventor: Richard R. Hummer, Jr., HCR 2, Box 216, Shandaken, N.Y. 12480

[21] Appl. No.: 792,469

[22] Filed: Nov. 12, 1991

[51] Int. Cl.⁵ .......................... B43L 7/00; B27B 9/04
[52] U.S. Cl. ........................................ 33/430; 83/745
[58] Field of Search ...................... 33/32.1, 32.2, 403, 33/430, 443; 83/743, 745, 465; 266/64; 269/1, 2, 152, 155

[56] References Cited

U.S. PATENT DOCUMENTS

| 2,778,383 | 1/1957 | Golasowski | 268/152 X |
| 3,910,146 | 10/1975 | Earl | 83/745 |
| 4,077,292 | 3/1978 | Cole | 83/745 |

Primary Examiner—Harry N. Haroian

[57] ABSTRACT

A guide bar for use in providing a straight edge to make a metal cut, usually on steel with an oxyacetylene torch, which can be used both on flat stock and also across the open section or center web between the top and bottom plates of an I-beam.

8 Claims, 2 Drawing Sheets

GUIDE BAR

BACKGROUND OF THE INVENTION

In cutting stock, usually steel stock with an oxyacetylene torch, cutters have frequently, in order to assure a straight cut, used a piece of scrap material and a pair of clamps as a cutting guide. The assembling of the required parts and the frequent misplacement of one of the required parts delays the rate of production. When cutting an I-beam across the center web, there is the added problem of being able to clamp a guide member onto the I-beam.

One feature of this invention is to provide a guide bar for use on flat stock where the clamps are both adjustable and affixed to the guide member so that the clamps and guide member are not readily separated. Still another feature is to provide a guide bar which can be used on I-beams, both on the top and bottom plates and across the center web between the top and bottom plates.

The present invention provides a general purpose guide bar which can be clamped readily to regular stock and can also be secured across the top and bottom webs of an I-beam and across the center web of an I-beam.

The novel features which are considered as characteristic of the invention are set forth with particularity in the appending claims. The invention, itself, however, as to its construction and obvious advantages will be best understood from the following description of the specific embodiment when read with the accompanying drawings.

SUMMARY OF THE INVENTION

The present invention provides a guide bar which can be used to guide the cutting of regular bar stock or plate and I-beams and has all of the necessary parts together in one adjustable unit.

The guide bar includes a length of bar stock, which serves as the guide member, with grooves in its top surface. Two C-clamps are slidably mounted but retained in the grooves. Each C-clamp includes a lower turn bolt which is threaded and which when turned moves by means of its thread toward the underside of the work piece to be cut. Each C-clamp has an L-shaped member affixed to the side of the C-clamp and an intermediate threaded opening in the side of the C-clamp adjacent to the L-shaped member An intermediate turn bolt is threaded into the intermediate threaded opening. Each intermediate turn bolt is aligned with its L-shaped member affixed to the same C-clamp so that the plate of the intermediate turn bolt may be threaded toward the L-shaped member. By gripping the edges of the top plate and the bottom plate of an I-beam between the pair of intermediate turn bolts and the pair of L-shaped members, the guide member can be securely held across the center web of an I-beam.

DESCRIPTION OF THE DRAWINGS

The present invention may be better understood and its numerous advantages will be apparent to those skilled in the art by reference to the accompanying drawings, wherein like reference numerals refer to like elements in the various figures in which.

DETAILED DESCRIPTION OF THE INVENTION

Figure 1:
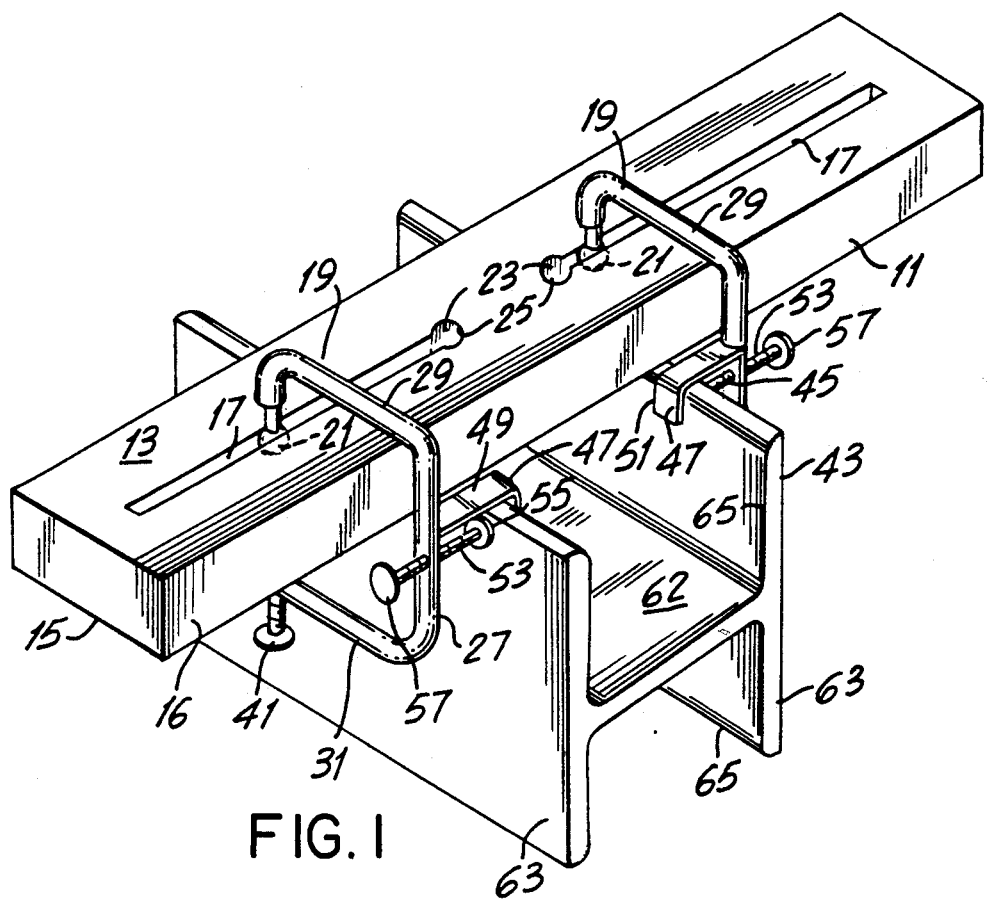
FIG. 1 is a pictorial view of the guide bar mounted by its L-shaped clips and intermediate turn bolt between the top plate and the bottom plate of an I-beam so as to cut across the center web of the I-beam.
Figure 3:
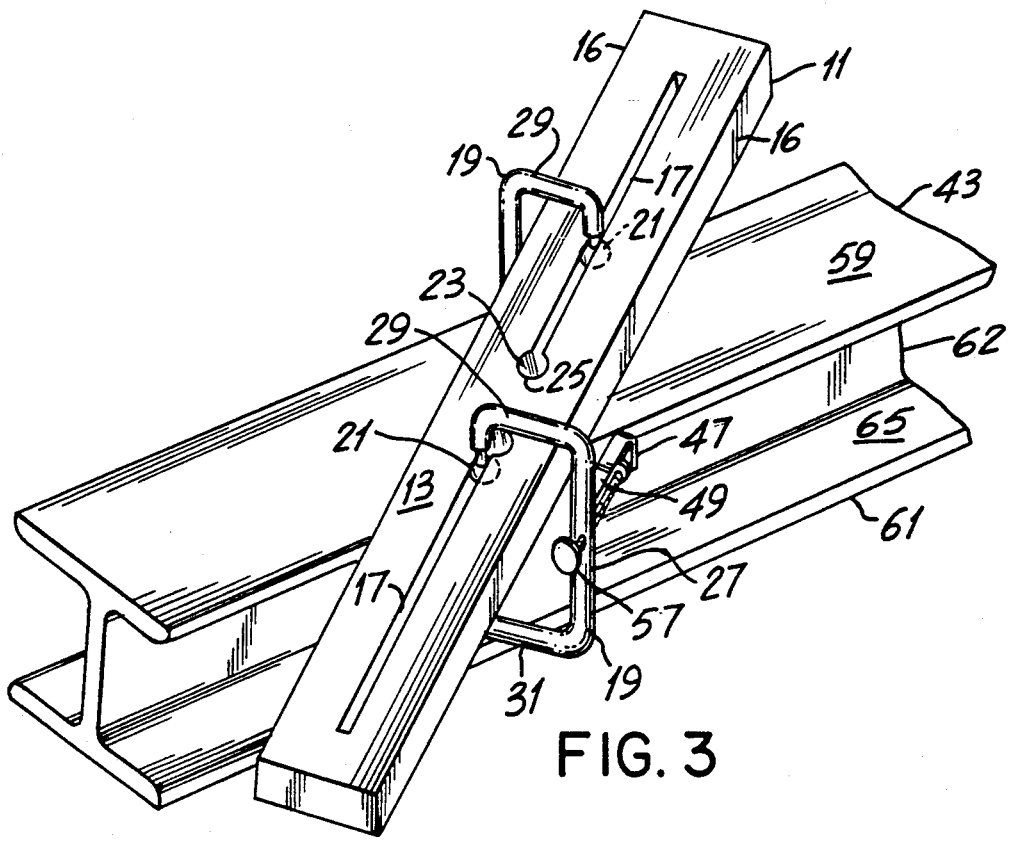
FIG. 3 is a pictorial view of the guide bar at an angle across the top plate of an I-beam with the lower turn bolt of the clamp pressed against the underside of the top plate of the I beam to hold the guide member in place.

Referring now to FIG. 1, a guide member 11 is provided from a length of bar stock. The guide member 11 which preferably has a rectangular cross-section, has an upper surface 13 and a lower surface 15 and two side surfaces 16. A pair of grooves 17 are formed in the upper surface 13 of the guide member 11. Each groove 17 extends from one end of the guide member 11 generally along the guide member 11 almost to the center of the guide member 11 and the pair of grooves 17 are aligned with each other along one common longitudional line and together extend from near one end of the guide member 11 to near the other end of the guide member 11 with a small separation at the center of the guide member 11. A pair of C-clamps 19 are slidably mounted in the grooves 17. Various means can be used to slidably mount the C-clamps 19 in the grooves 17, but a ball 21 readily slides in the grooves 17, particularly a groove 17 of circular cross section properly sized. A round opening 23 at the inner ends 25 of the pair of grooves 17 permits the ball 21 of each of the C-clamps 19 to be inserted into the pair of grooves 17. One continuous groove (not shown) in place of the pair of grooves 17 could also be used with only one circular opening (not shown) but similar to the round openings 23 and preferably located at the center of such a single groove.

The C-clamps 19 utilized have a special design. Each C-clamp 19 includes a center section 27 with a top section 29 and a bottom section 31 both at approximately right angles to the center section 27. The top section 29 and the bottom section 31 of the C-clamps 19 are generally parallel and aligned with one another. A fixed end section 33, extends at right angles from the top section 29 generally to align with the center section 27. The ball 21 is mounted at the outside end of the fixed end section 33. The outer end of the bottom section 31, has a lower threaded opening 35 in it. A lower turn bolt 37, whose path of movement is aligned with the center section 27 and is directed at the ball 21 on the end of the fixed end section 33 is mounted in the lower threaded opening 35. A lower plate (not shown) is located on the inner end of the lower turn bolt 37. A lower turn handle 41 is mounted on the outside end of the lower turn bolt 37 opposite from the lower plate 39. With the ball 21 mounted in the grooves 17, the lower plate (not shown) of the lower turn bolt 37 will press against the lower surface of a work member to be cut, shown as an I-beam 43 in FIGS. 1 and 2, thereby securing the guide member 11 against the I-beam 43.

In the center section 27 of each C-clamp 19, generally in the mid-area of the center section 27, an intermediate threaded opening 45 is formed. Adjacent the intermediate threaded opening 45, an L-shaped member 47 is affixed to the C-clamp 19. The L-shaped member 47 has two sections, namely a horizontal section 49 affixed generally at a right angle to the center section 27 of each C-clamp 19 and a vertical section 51 extending generally at right angles from the outer end of the horizontal section 49 and parallel to the center section 27. The horizontal section 49 of the L-shaped member 47 is located generally at right angles to the top section 29 and the bottom section 31 of each C-clamp 19. An intermediate turn bolt 53 is mounted in the intermediate threaded opening 45 also generally at right angles to the center section 27 of each C-clamp 19 and paralled and aligned with the horizontal section of the L-shaped members 47. The horizontal section 49 of the L-shaped member 47 is also generally in a common plane with the lower surface of the guide member 11. With the pair of C-clamps 19 mounted on the guide member 11, the two L-shaped members 47 are generally directed toward one another as can best be seen in FIG. 1. Each intermediate turn bolt 53 also includes an intermediate plate 55 and an intermediate turn handle 57. By turning down both intermediate turn handles 57, the intermediate plates 55 move toward the vertical sections 51 of the L-shaped member 45 affixed to the same C-clamp 19. In the alternative, the intermediate turn bolts 53 may be threaded in the vertical sections 55 rather than in the center sections 27.

When the guide bar is used on work member 43 such as flat stock (not shown) or across the top surface of an I-beam 43, the intermediate turn bolts 53 and L-shaped members 47 are not used. Rather, the work member 43 to be cut is clamped with the lower turn bolt 37 against the work member 43. The C-clamps 19 are swung away from the work member 43 to avoid having the L-shaped members 47 and intermediate turn bolts 53 interfere with the work member 43.

I-beams 43 are well known and include a top plate 59 and a bottom plate 61. The top plate 59 and the bottom plate 61 are the same and either one may become the other by merely turning the I-beam 43 over. Both the top plate 59 and the bottom plate 61 have an outside surface 63 and an inside surface 65. Affixing a guide member 11 across the top plate 59 is not a problem but across the center web 62 of an I-beam 43, serious difficulties exist in affixing a guide member 11 to assure a straight and accurate cut.

Figure 2:
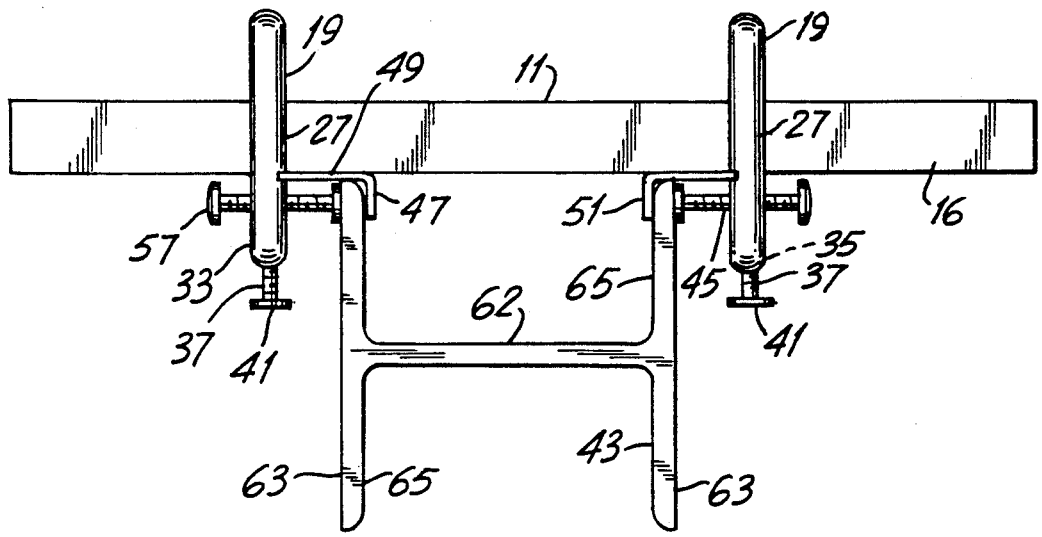
FIG. 2 is an end view of the I-beam showing the guide bar mounted on the I-beam across the center web as shown in FIG. 1.
Figure 4:
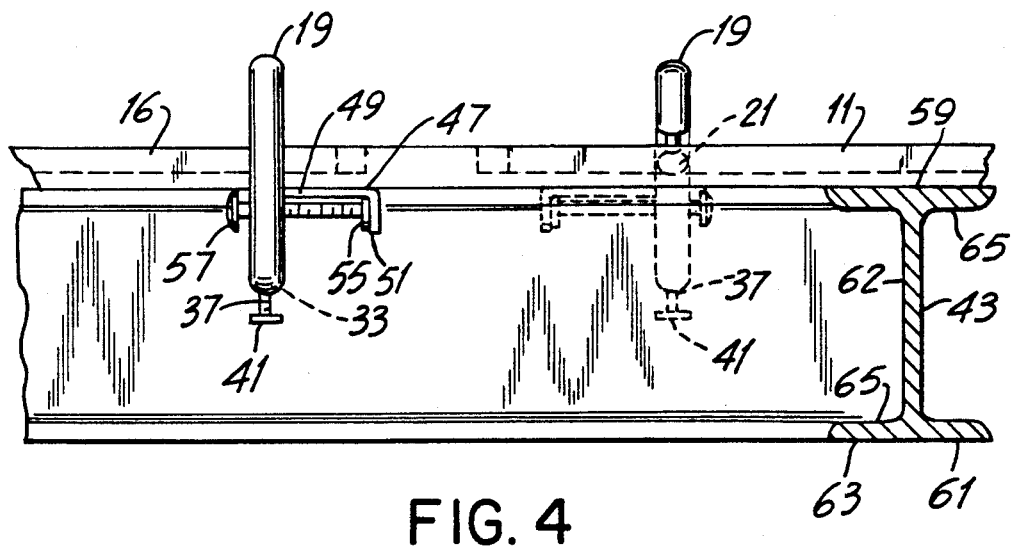
FIG. 4 is a side view of FIG. 3 looking perpendicularly at the guide bar as shown in FIG. 3.

As best seen in FIGS. 1 and 2, the guide bar according to this invention may be readily mounted between the top plate 59 and bottom plate 61 and across the center web 62 of an I-beam 43 to provide an accurate cut.

The vertical section 51 of one L-shaped member 47 is placed against the inside surface 65 of either the top plate 59 or the bottom plate 61 of an I-beam 43 and the vertical section 51 of the other L-shaped member 47 is placed against the other top plate 59 or bottom plate 61. The C-clamps 19 are located outside the I-beam 43. The intermediate turn bolts 53 are turned down against the outside surface 63 of the top plate 59 and the bottom plate 61 thus securing the guide member 11 in place across the center web 62 of the I-beam 43.

While a preferred embodiment has been shown and described, various modifications and substitutions may be made without departing from the spirit and scope of this invention. Accordingly, it is understood that this invention has been described by way of illustration rather than limitation.

I claim:

1. A guide bar for cutting members such as steel I-beams, said guide bar comprising:
   a guide member having an upper surface and said guide member having a groove means in its upper surface;
   a pair of C-clamps each having an upper end and a lower end, with a threaded opening in the lower end and a lower turn bolt mounted on the threaded opening, the upper end of each C-clamp slidably retained in the groove means in the upper surface of the guide member, each of the pair of C-clamps further including an L-shaped member affixed to the C-clamp, each C-clamp having an intermediate threaded opening, an intermediate turn bolt mounted in the intermediate threaded opening, the intermediate turn bolt being aligned with the L-shaped member.

2. A guide bar according to claim 1 wherein:
   each C-clamp has a center section, a top section including the upper end and a bottom section including the lower end, the top section and bottom section being located at opposite ends of the center section and at a generally right angle to the center section and parallel and aligned with one another, the intermediate turn bolt being generally at right angles to the center section and the top section and bottom section and being located on the center section generally midway between the top section and the bottom section.

3. A guide bar according to claim 1 wherein:
   the guide member has a lower surface; and
   the L-shaped member is generally aligned with the lower surface of the guide member.

4. A guide bar according to claim 1 wherein:
   each C-clamp has a center section, a top section including the upper end and a bottom section including the lower end, the top section and bottom section being located at opposite ends of the center section and at a generally right angle to the center section and parallel and aligned with one another; and
   the L-shaped member has a horizontal section and a vertical section, the horizontal section extending generally at right angles from the center section of the C-clamp and the vertical section extending generally at right angles from the horizontal section at the end of the horizontal section remote from the center section of the C-clamp, the horizontal section of the L-shaped member also being substantially at right angles to the top section and the bottom section of the C-clamp.

5. A guide bar according to claim 1 wherein:
   guide member a lower surface; and
   each C-clamp has a center section, a top section including the upper end and a bottom section including the lower end the top section and the bottom section being located at opposite ends of the center section and at a generally right angle to the center section and parallel and aligned with one another, an intermediate threaded opening in the C-clamp said intermediate threaded opening being adjacent the L-shaped member and in the center section of the C-clamp generally midway between the top section and the bottom section, the intermediate turn bolt mounted in the intermediate threaded opening, the L-shaped member having a horizontal section and a vertical section, the horizontal section extending generally at right angles from the center section of the C-clamp and the vertical section extending generally at right angles from the horizontal section at the end of the horizontal section remote from the center section of the C-clamp, the horizontal section of the L-shaped member also being substantially at right angles to the top section and bottom section of the C-clamp, the L-shaped member further being generally aligned with the lower surface of the guide member.

6. A guide bar for cutting members such as steel I-beams, said guide bar comprising:
   a guide member having an upper surface and said guide member having a groove means in its upper surface; and
   a pair of C-clamps each having an upper end and a lower end, with a threaded opening in the lower end and a lower turn bolt mounted on the threaded opening, the upper end of each C-clamp slidably retained in the groove means in the upper surface of the guide member, each of the pair of C-clamps further including an L-shaped member affixed to the C-clamp, each C-clamp having an intermediate threaded opening in the C-clamp, an intermediate turn bolt mounted in the intermediate threaded opening, the intermediate turn bolt being aligned with the L-shaped member; the intermediate turn bolt being located generally midway between the upper end and the lower end of the pair of C-clamps.

7. A guide bar for cutting members such as steel I-beams, said guide bar comprising:
   a guide member having an upper surface and said guide member having a groove means in its upper surface;
   a pair of C-clamps each having an upper end and a lower end, with a threaded opening in the lower end and a lower turn bolt mounted on the threaded opening, the upper end of each C-clamp slidably retained in the groove means in the upper surface of the guide member, each of the pair of C-clamps further including an L-shaped member affixed to the C-clamp, each C-clamp having an intermediate turn bolt means, the intermediate turn bolt being aligned with the L-shaped member, each C-clamp having a center section, a top section including the upper end and a bottom section including the lower end, the top section and bottom section being located at opposite ends of the center section and at a generally right angle to the center section and parallel and aligned with one another, the L-shaped member being generally at right angles to the center section and the top section and bottom section and being located on the center section generally midway between the top section and the bottom section.

8. A guide bar according to claim 7 wherein:
   the guide member has a lower surface; and
   the L-shaped member is generally aligned with the lower surface of the guide member.

* * * * *